(12) United States Patent
Wauters

(10) Patent No.: US 9,284,081 B2
(45) Date of Patent: Mar. 15, 2016

(54) PLASTIC CONTAINER, METHOD FOR MANUFACTURE THEREOF AND RING FOR A CONTAINER

(71) Applicant: DISPACK-PROJECTS NV, Destelbergen (BE)

(72) Inventor: Albert Marie Wauters, Destelbergen (BE)

(73) Assignee: Dispack-Projects NV, Destelbergen (BE)

( * ) Notice: Subject to any disclaimer, the term of this patent is extended or adjusted under 35 U.S.C. 154(b) by 0 days.

(21) Appl. No.: 14/281,568

(22) Filed: May 19, 2014

(65) Prior Publication Data

US 2014/0251940 A1    Sep. 11, 2014

Related U.S. Application Data

(63) Continuation-in-part of application No. 13/643,965, filed as application No. PCT/BE2011/000031 on May 19, 2011, now Pat. No. 8,763,825.

(30) Foreign Application Priority Data

May 20, 2010    (BE) ................................. 2010/0302

(51) Int. Cl.
*B65B 31/00*    (2006.01)
*B65D 23/00*    (2006.01)
(Continued)

(52) U.S. Cl.
CPC . *B65B 31/00* (2013.01); *B65D 1/16* (2013.01); *B65D 23/001* (2013.01);
(Continued)

(58) Field of Classification Search
CPC .. B65D 1/023; B65D 1/0246; B65D 21/0231; B65D 21/023; B65D 21/0209; B65D 1/0261; B65D 1/0223; B65D 1/16; B65D 23/001; B65D 1/02; F17C 1/02; B29C 49/08; B29C 49/0042; B29C 49/185; B65B 31/00
USPC ................. 215/43, 42, 40, 10; 264/537, 523; 220/4.05, 4.04, 581; 206/509, 511, 206/512, 504, 503
See application file for complete search history.

(56) References Cited

U.S. PATENT DOCUMENTS 2,029,811 A    2/1936    Davis
2,077,027 A    4/1937    Vincent
(Continued)

FOREIGN PATENT DOCUMENTS

CN    1129637 A    8/1996
DE    19723114    12/1998
(Continued)

*Primary Examiner* — Robert J Hicks
(74) *Attorney, Agent, or Firm* — Bret E. Field; Bozicevic, Field & Francis LLP

(57) ABSTRACT

Plastic container, particularly for storing liquid under pressure, comprising an integrally formed body with a bottom, an upright substantially cylindrical side wall and an upper side with a neck having a bottom end and an open top end in which a closing element of the container can be mounted, wherein the upper side of the container, around the neck, is formed with at least one shoulder and at least one valley which runs downward in radial direction from the neck in the direction of the upright side wall; wherein each shoulder protrudes upward relative to the at least one valley; which at least one shoulder and at least one valley are formed integrally with the body of the container.

17 Claims, 11 Drawing Sheets

(51) Int. Cl.
  *B65D 1/16* (2006.01)
  *B29L 31/00* (2006.01)
  *B29C 49/00* (2006.01)
  *B29C 49/08* (2006.01)
  *B29C 49/18* (2006.01)
  *B29C 49/20* (2006.01)
  *B29C 49/46* (2006.01)

(52) U.S. Cl.
  CPC ............ *B29C 49/0042* (2013.01); *B29C 49/08* (2013.01); *B29C 49/185* (2013.01); *B29C 2049/2017* (2013.01); *B29C 2049/2039* (2013.01); *B29C 2049/4664* (2013.01); *B29L 2031/7158* (2013.01); *Y10T 29/49815* (2015.01)

(56) References Cited

U.S. PATENT DOCUMENTS

| | | |
|---|---|---|
| 2,330,982 A | 10/1943 | Butlers et al. |
| 2,641,374 A | 6/1953 | Yee et al. |
| 2,687,822 A | 8/1954 | Gunnar |
| 4,257,527 A | 3/1981 | Snyder et al. |
| 5,635,226 A | 6/1997 | Koda et al. |
| 6,047,846 A | 4/2000 | Watson |
| 6,588,612 B1 * | 7/2003 | Dorn et al. ............... 215/10 |
| D672,657 S * | 12/2012 | Hall ............................ D9/531 |
| 2006/0290035 A1 | 12/2006 | Yoshiike et al. |
| 2007/0108232 A1 | 5/2007 | Loebach |
| 2008/0223816 A1 | 9/2008 | Darr et al. |
| 2008/0283533 A1 | 11/2008 | Tilton et al. |
| 2010/0199609 A1 | 8/2010 | Rivera et al. |

FOREIGN PATENT DOCUMENTS

| | | |
|---|---|---|
| EP | 0661214 | 7/1995 |
| EP | 0955241 | 11/1999 |
| FR | 2105886 | 4/1972 |
| FR | 2079237 | 1/1982 |
| NL | 2001397 | 9/2009 |
| RU | 47327 U1 | 8/2005 |
| WO | WO2008098939 | 8/2008 |

* cited by examiner

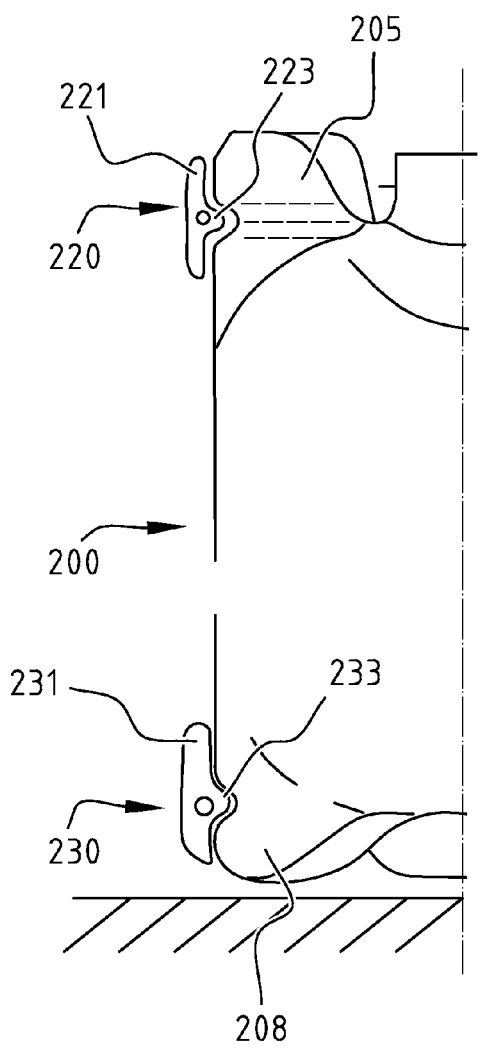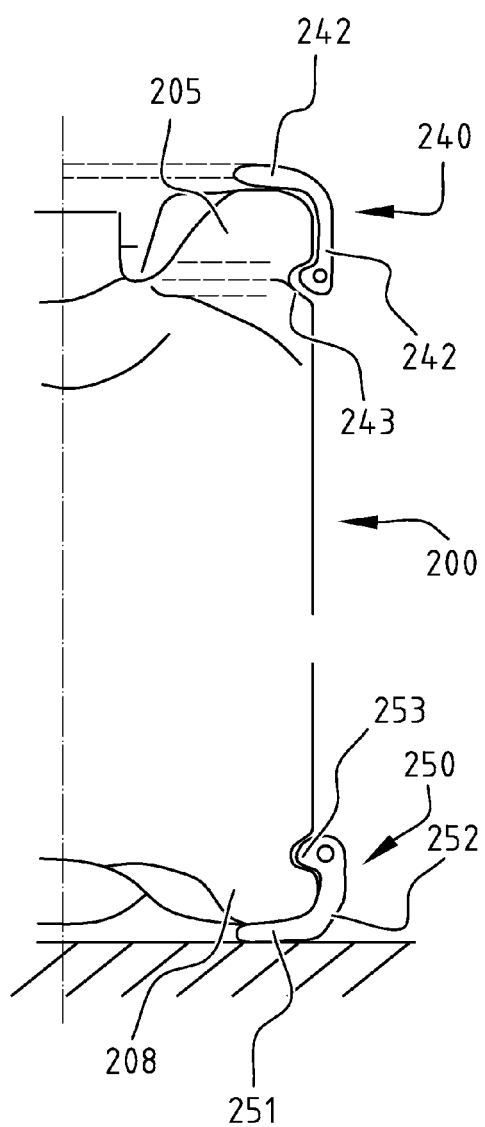
FIG. 8A
FIG. 8B

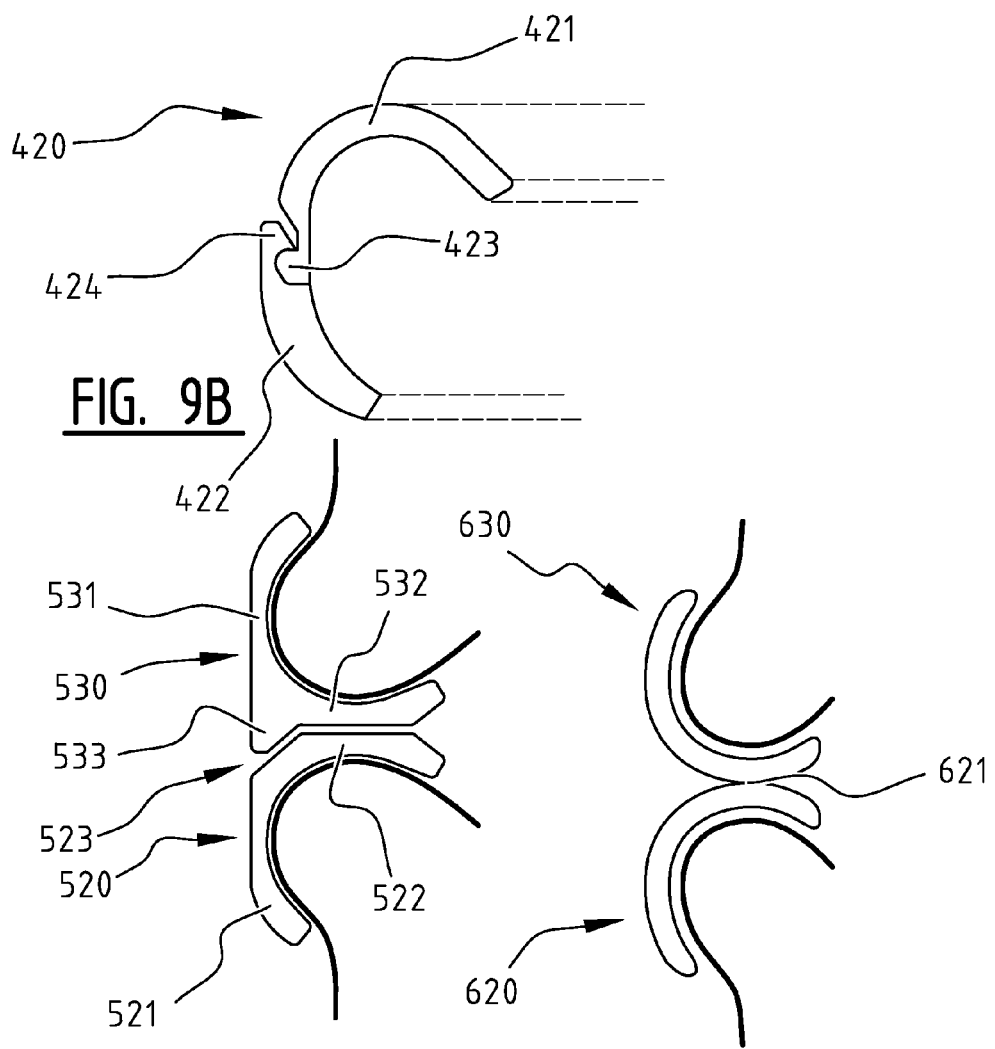

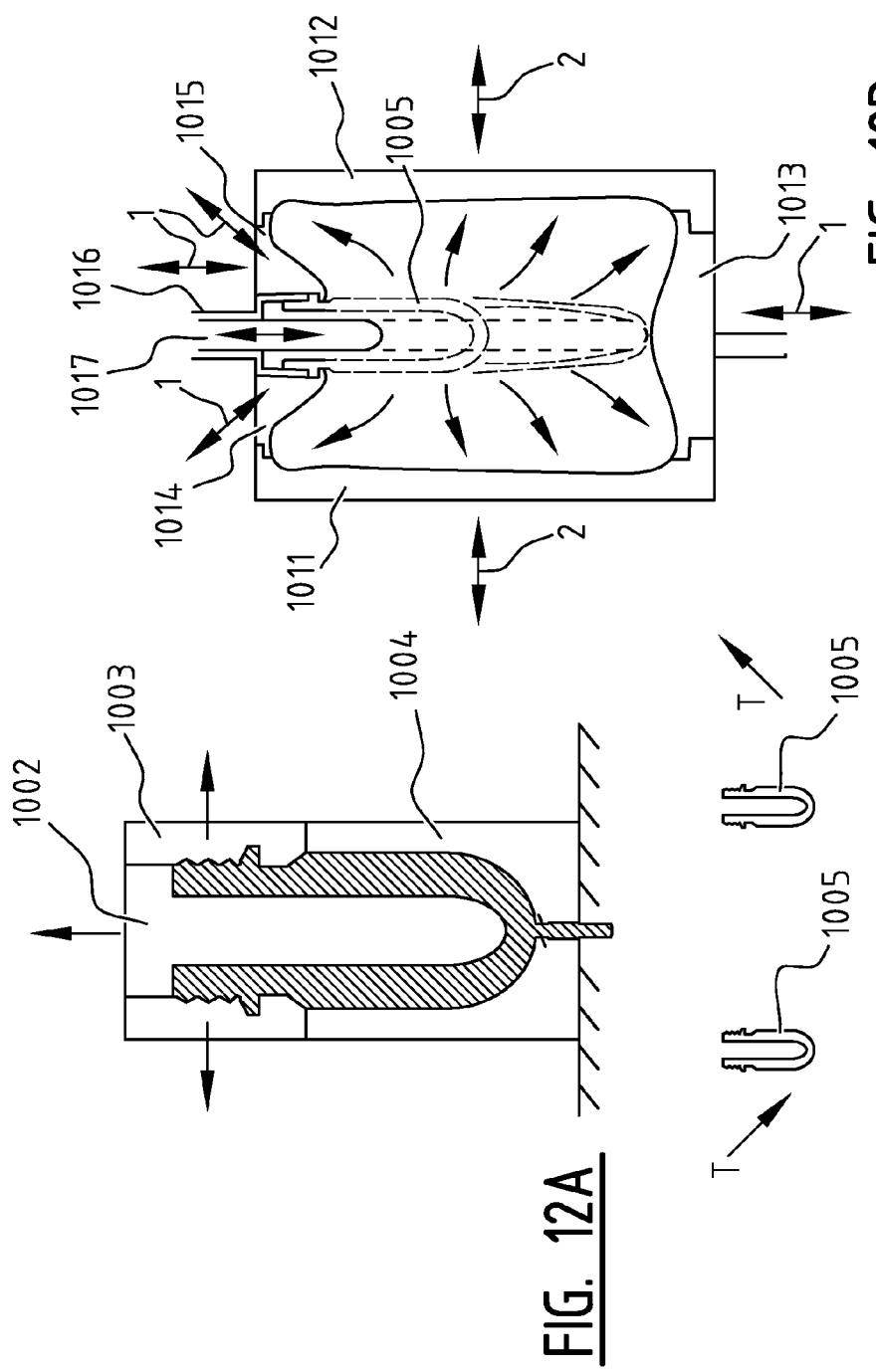

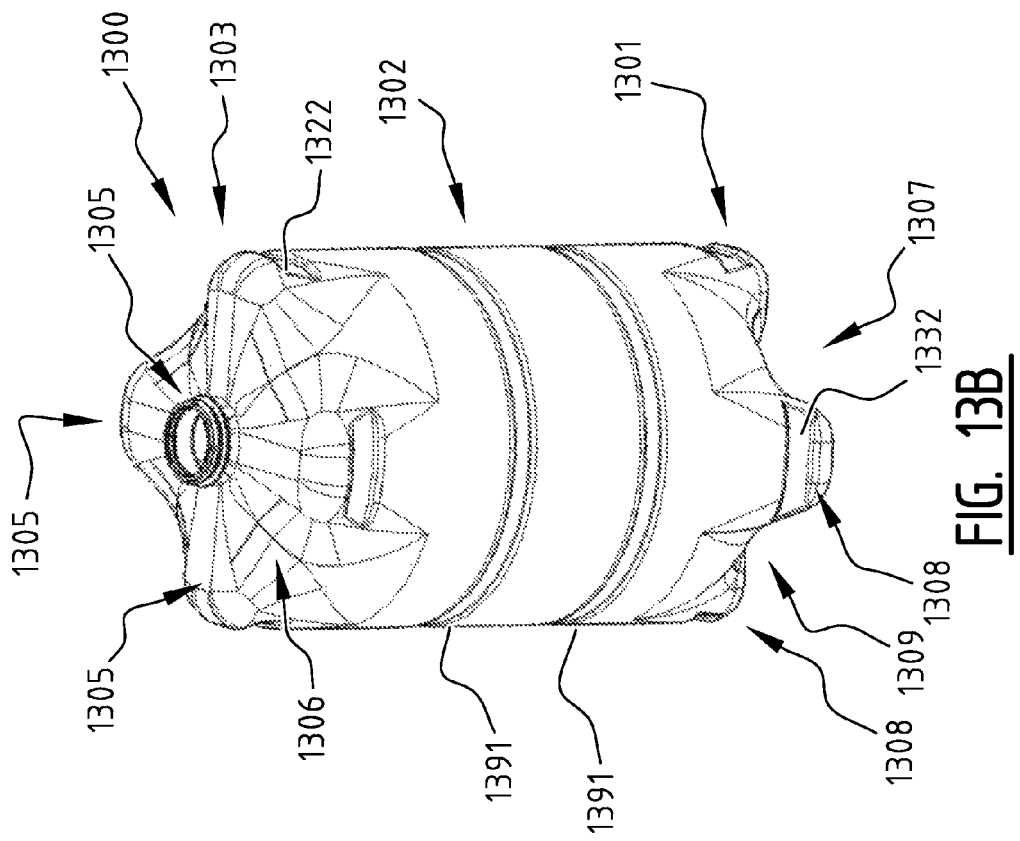
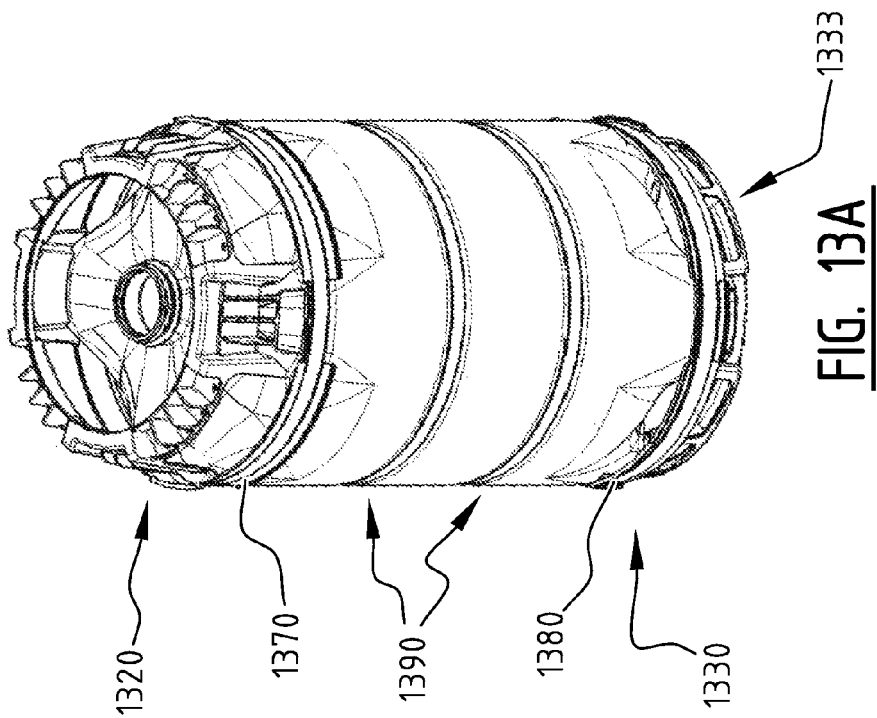

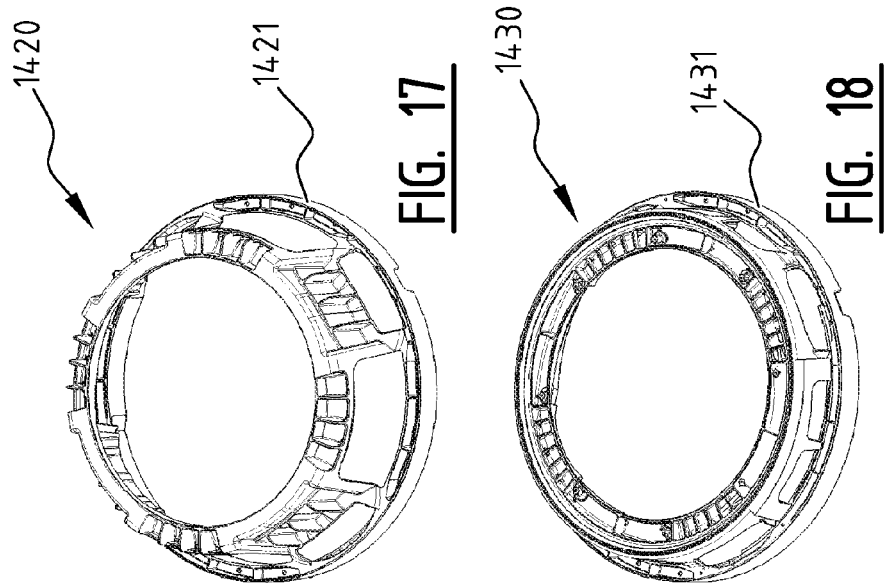
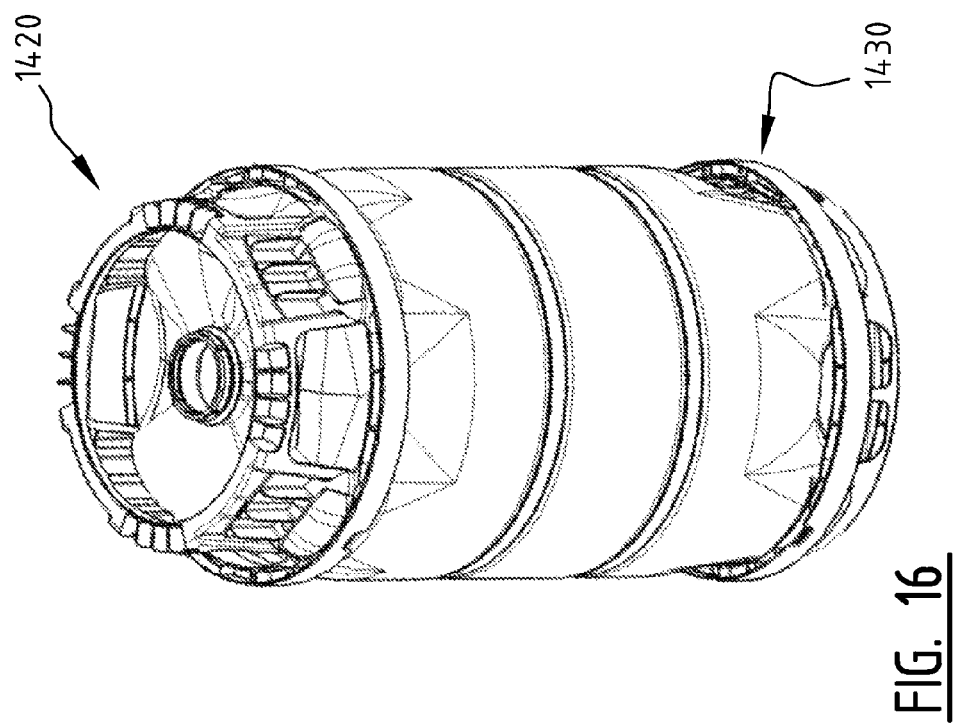

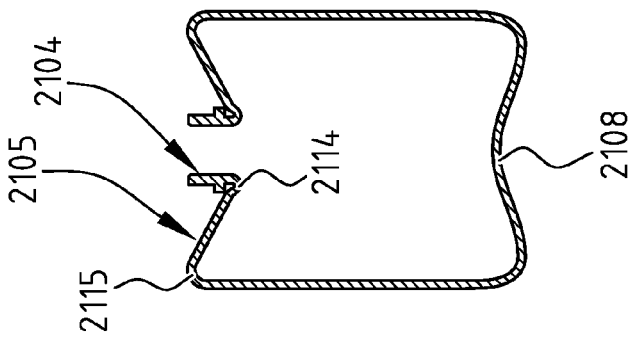
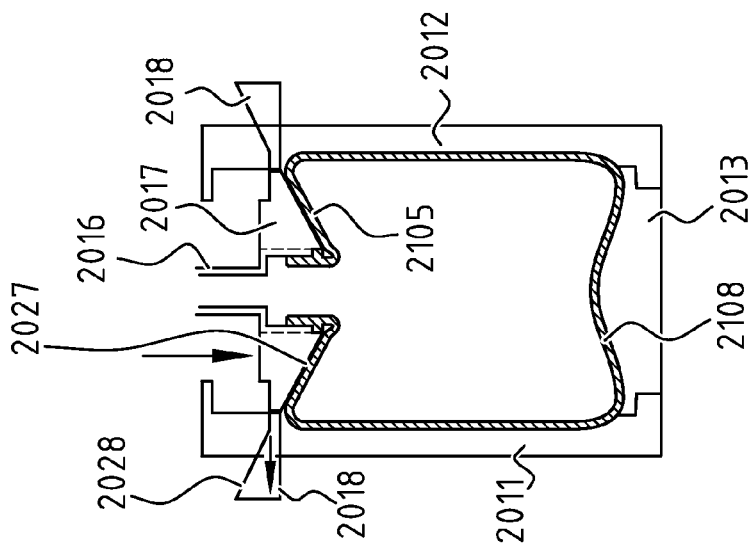
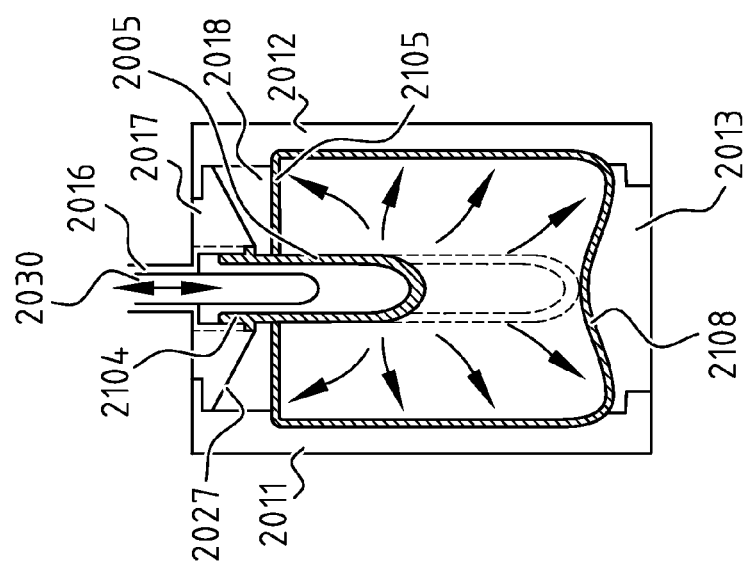

PLASTIC CONTAINER, METHOD FOR MANUFACTURE THEREOF AND RING FOR A CONTAINER

CROSS-REFERENCE TO RELATED APPLICATIONS

This application is a continuation-in-part of U.S. patent application Ser. No. 13/643,965 filed Oct. 26, 2012; which application is 371 national phase application of PCT/BE2011/000031 filed on May 19, 2011, which application claims priority to Belgian Application Serial No. BE 2010/0302 filed May 20, 2010; the disclosures of which applications are herein incorporated by reference.

INTRODUCTION

1. Field of the Invention

The present invention relates to a plastic container, particularly for storing a fluid under pressure, comprising an integrally formed body with a bottom, an upright substantially cylindrical side wall and an upper side with a neck having an open top end in which a closing element of the container can be mounted. The present invention relates particularly to a container for once-only use which is recyclable.

2. Background of the Invention

The existing containers manufactured integrally from plastic, typically from a PET material, do not usually have sufficient strength to be properly handled, transported and stacked without further strengthening packagings or casings. In addition, the ratio of volume of product/volume of air in a container load is typically anything but optimal.

SUMMARY

The present invention has for its object to provide a container of the type stated in the preamble and a method for manufacture thereof which allow the ratio of volume of product/volume of air to be improved and/or the strength of the container to be increased.

The container according to the invention is distinguished for this purpose in that the upper side of the container, around the neck, is formed with at least one shoulder. The upper side is further formed along the periphery of the neck with at least one valley which runs downward from the neck in the direction of the upright side wall. The at least one shoulder protrudes upward relative to the at least one valley. The at least one shoulder and the at least one valley are formed integrally with the body of the container.

In the prior art containers of plastic the upper side of a container typically has an upper wall running downward from the neck. The invention is based on the insight that, by providing at least one shoulder, and typically at least two shoulders, an additional volume is created whereby the above stated ratio of volume of product/volume of air can be improved considerably compared to the prior art containers. The profiling formed by the at least one shoulder and at least one valley can further also impart the necessary strength to the container.

The at least one valley will allow a ring placed around the at least one shoulder to form a handle at the position of each valley, see below. The valley typically has the purpose of creating a radial recess from the lower part of the neck to the upright wall, wherein in this structure will largely determine the strength and resistance to pressure of the container. The at least one valley further has the additional advantage that rainwater or flushing water can be drained in the upright position of the container. Note that in the prior art beer containers the drainage holes are typically formed by recesses in the rings provided around the container body.

In the case of two or more shoulders the valleys will typically be located between each pair of mutually adjacent shoulders. In such a case the shoulders are typically distributed symmetrically around the neck. In the case of one shoulder, this will typically take the form of a continuous ring, wherein the valley is located between the shoulder ends. Although the container according to the invention is particularly intended for storing carbonated liquids under pressure—envisage a beer cask—such a container can advantageously also be employed for the storage of pressureless liquids, gasses and solids.

According to the preferred embodiment of the invention, the container body is manufactured by stretch blow moulding, preferably from a PET (polyethylene terephthalate) material, for instance a so-called bottle grade PET material. According to another possibility, the container body is manufactured from PE or PP.

According to an advantageous embodiment, each shoulder runs in radial direction from the neck at least partially horizontally or upward in the direction of the upright side wall. According to another possibility, each shoulder slopes downward to some extent in the direction of the upright side wall (preferably at an angle of less than 45°, still more preferably less than 25°), wherein each shoulder does still protrude upward relative to the at least one valley.

According to an embodiment, the at least one shoulder is adapted to form a support surface for the bottom of a second container which is placed on the container, wherein the support surface is situated at the same height or higher than the bottom end of the neck. In this way the containers can be placed on one another in simple manner without additional strengthening means being necessary.

According to an advantageous embodiment of the container according to the invention, an upper ring is provided around the at least one shoulder. The upper ring is preferably adapted to form a support ring on which the container can be rolled in a tilted position in which the central axis of the container extends substantially horizontally; and/or to form a support surface for a second container which is placed on the container.

According to a further aspect of the invention, the at least one valley and the at least one shoulder are shaped such that the upper ring forms a handle at the position of the at least one valley. In the prior art containers the ring is typically arranged around a continuous upright side wall so that the upper ring cannot readily function as a handle and, if this is desired, special handles have be provided in the upper ring itself. In the prior art recesses are thus arranged in the upper ring in order to form handles. This does however affect the strength of the upper ring.

According to a possible embodiment, the upper ring has an inner wall intended to connect to the at least one shoulder. This inner wall can be formed with one or more thickened portions, wherein each shoulder has an outer wall which is provided with one or more recesses having a form complementary to the one or more thickened portions. In this manner the upper ring can be locked in the container body, particularly when this container body is under pressure, see below.

According to an advantageous embodiment, the upper side is provided with at least two shoulders arranged at a distance from each other along the outer periphery of the neck, this such that valleys extend between the shoulders, which valleys run downward in the direction of the upright side wall.

According to an advantageous embodiment, the at least one shoulder runs substantially horizontally from the bottom end of the neck to the upright side wall. According to another variant a first part of the at least one shoulder runs upward from the bottom end of the neck and a second part substantially horizontally in the direction of the upright side wall. This second part typically forms a support surface.

According to the preferred embodiment, the upright cylindrical side wall is substantially straight and each shoulder has a substantially straight upright outer wall which connects to the straight, upright cylindrical side wall.

According to the preferred embodiment the bottom is formed with a substantially centrally located recess directed toward the interior of the container. This recess is preferably adapted to receive a part of the neck of a second container when the container is placed on the second container.

According to the preferred embodiment the bottom is formed with at least one support foot, typically at least two support feet, which extend at a distance from each other around the central recess. In the case there are at least two support feet, a radial recess preferably extends in each case between each pair of mutually adjacent support feet.

According to an advantageous embodiment the upright cylindrical side wall is substantially straight and each support foot has a substantially straight, upright outer wall which connects to the straight, upright cylindrical side wall.

According to a further aspect of the invention, a lower ring is provided around the at least one support foot. This lower ring is typically adapted to form a support ring on which the container is rolled in a tilted position in which the central axis extends substantially horizontally; and/or to form a bottom support surface.

According to an advantageous embodiment the upper and/or the lower ring is embodied in a PET material, preferably recycled PET from a recycling circuit. Depending on the required strength (impact, drop), another material such as PE or PP could however also be used. The upper ring is preferably manufactured by injection moulding, gas injection moulding or with a technique in which foamed or expanded PET or PE is used.

According to an advantageous aspect the at least one radial recess and the at least one support foot are shaped such that the lower ring forms a lower handle at the position of each radial recess. The same advantages relative to the prior art apply here as stated above for the upper ring. According to a possible embodiment the lower ring has an inner wall intended for connection to the outer wall of the at least one support foot. This inner wall can be formed with one or more thickened portions, wherein each support foot has an outer wall provided with one or more recesses having a form complementary to the one or more thickened portions.

According to the preferred embodiment of the container, an upper ring is provided around the at least one shoulder and a lower ring is provided around the at least one support foot. The upper and/or lower ring are preferably manufactured from a PET material, preferably by injection moulding.

According to a preferred embodiment hereof, the number of valleys on the upper side and the number of radial recesses in the bottom are equal, and each valley lies substantially in the same radial plane as a corresponding recess such that the handles have the same orientation on the upper and lower sides.

According to a further developed embodiment the upper ring can be connected to the lower ring by means of at least two bands, preferably manufactured from a PET material, which bands extend along the upright cylindrical side wall. Horizontal bands can further also be provided which extend in the valleys between two diametrically opposite points of the upper/lower ring in order to tension the upper/lower ring around the container. According to yet another variant, the upper/lower ring can be formed integrally with a strengthening profile located inside the ring and having a shape substantially complementary to the shape of the upper side/bottom of the container.

According to a possible embodiment a clamping band is provided around the upper ring and/or around the lower ring. This clamping band is arranged in order to transmit to the clamping band the forces exerted on the upper ring and/or lower ring as a result of the pressure in the container. In this way the upper and/or lower ring will not be subject to creep or excessive stresses, and will not deform, or negligibly so.

The cylindrical side wall of the container can further be provided with a peripheral groove, in which peripheral groove a clamping band is arranged in order to prevent the outer diameter of the container increasing too much when the container is filled with a fluid under pressure.

According to an aspect of the invention there is provided a method for manufacturing a container by stretch blow moulding of a thermoplastic material, comprising the steps of: providing a preform with a neck part; fixing said preform around said neck part; stretching and blowing the preform for the purpose of forming a container body, wherein the thermoplastic material is formed around the neck with at least one shoulder with a top which is situated at the same height or higher than the bottom end of the neck part. By creating the at least one shoulder at the same level or at a higher level than the bottom end of the neck part, the storage volume is increased whilst not requiring more space during transport. Further the neck is less exposed, and components mounted on the neck are less prone to damage.

According to a possible embodiment the stretching and blowing comprises blowing the thermoplastic material upwardly to form the at least one shoulder. Alternatively or in addition, the forming of the container body may comprise blow moulding an intermediate container body and pushing the neck part downward whilst supporting the blow moulded intermediate container body to form at least one shoulder with a top which is situated at the same height or higher than the bottom end or the neck part. This pushing inward of the neck part is preferably performed whilst the thermoplastic material that is being deformed during this operation, i.e. the material between the neck part and an upright sidewall of the container body, is in a deformable state, typically at a sufficiently high temperature. For a PET material the temperature will be typically between 100 degrees Celsius and 120 degrees Celsius.

In the embodiment in which the material of the preform is blown upwardly, use may be made of a multi-part mould comprising two horizontally movable side wall moulds, a vertically movable lower mould and a multi-part upper mould, wherein the upper mould preferably has at least two parts which can move either horizontally and vertically or obliquely, and a vertically movable central part for guiding a stretch rod.

In an embodiment where the neck part is pushed inward, a multi-part mould may be used to form a container body by stretch blow moulding, whereupon one or more parts of the multipart mould are removed and the neck part is pushed inward to deform the container body and create said at least one shoulder with a top which is situated at the same height or higher than the bottom end of the neck part. In an exemplary embodiment use may be made of a multi-part mould comprising two side wall mould parts, a lower mould part and a plurality of upper mould parts, wherein the plurality of upper mould parts preferably comprises at least one removable mould part which can be removed before pushing the neck downward. The plurality of upper mould parts may comprise e.g. a shoulder forming part having an inclined bottom wall extending upwardly in a radial direction around the neck part, and a removable part located below the shoulder forming part during the stretch blow moulding, said removable part being removed after the stretch blow moulding step, whereupon the shoulder forming part is moved downward to form the at least one shoulder with a top which is situated at the same height or higher than the bottom end of the neck part.

The invention further relates to a method for manufacturing a container according to any of the foregoing claims, wherein the container body is manufactured from a PET material by a stretch blow moulding process, comprising the following steps of:

making a preform, preferably a tubular preform with neck part, by injection moulding;

stretching and blowing the preform in a multi-part mould for the purpose of forming the container body, wherein the PET material is blown on around the neck to form the at least one shoulder. The multi-part mould typically comprises two horizontally movable side wall moulds, a vertically movable lower mould and a multi-part upper mould. The upper mould preferably has at least two parts which can move both horizontally and vertically, and a vertically movable central part for guiding a stretch rod. The advantage of a multi-part upper mould is on the one hand that the shoulders can be blown upward and on the other that mould parts can be removed from the undercuts, whereby a shaping according to the invention is possible.

According to another aspect there is provided a method for arranging a ring on a plastic container, comprising an integrally formed body with a bottom; an upright, substantially cylindrical side wall; and an upper side with a neck having an open top end in which a closing element of the container can be mounted. The ring is arranged around the upright side wall in the pressureless state of the container or in a state in which a low pressure prevails in the container, and the closing element is arranged in the neck of the container. The container is then filled with a fluid under pressure in order to secure the ring.

According to an advantageous embodiment of this method, the upper ring and lower ring are arranged around respectively the at least one shoulder and the at least one support foot in the pressureless state or in a state in which a low pressure prevails in the container, and the closing element is arranged in the neck of the container. The container is then filled with a fluid under pressure in order to secure the lower and upper ring. It will be apparent that such a method can be used for the different above described embodiments of upper and lower ring. A first initial tension can already be applied to the container body by providing a low pressure (for instance between 0.05 and 0.30 bar).

The volume of a container according to the invention lies typically between 5 liters and 50 liters, and preferably between 10 liters and 33.33 liters. The diameter of the cylindrical side wall lies typically between 200 mm and 400 mm, and preferably between 285 and 305 mm, or between 235 and 250 mm.

In the phrase "substantially cylindrical side wall" the term "cylindrical" must be interpreted in a broad sense, and also includes side walls with a section which is elliptical, oval and so on, and cylindrical side walls whose diameter can vary in axial direction, as is the case for a container in the form of a barrel.

BRIEF DESCRIPTION OF THE FIGURES

The present invention will be further elucidated on the basis of a number of by no means limitative exemplary embodiments of the container and of the method according to the invention, with reference to the accompanying drawings, in which:

FIG. 8A shows schematically an embodiment corresponding to FIG. 2, wherein a third variant of an upper and lower ring is arranged;

FIG. 8B illustrates schematically an embodiment corresponding to FIG. 2, wherein a fourth variant of an upper and lower ring is arranged;

FIG. 9A shows a schematic cross-section of a fifth variant of an upper or lower ring according to the invention;

FIG. 9B shows a schematic cross-section of a sixth embodiment of an upper or lower ring according to the invention;

FIG. 10A illustrates schematically a seventh variant of an upper and lower ring according to the invention;

FIG. 10B illustrates schematically an eighth variant of an upper and lower ring according to the invention.

FIGS. 12A-D illustrate schematically a first exemplary embodiment of a method for manufacturing a container according to the invention;

FIGS. 13A and 13B show a perspective view of a fourth embodiment of a container according to the invention, respectively with or without an upper and lower ring;

FIG. 16 shows a perspective view of a fifth embodiment of a container with an upper and lower ring according to the invention; and FIGS. 17 and 18 show a perspective view of respectively the upper ring as seen from the upper side and the lower ring as seen from the underside of the container of FIG. 16; and FIGS. 19A-C illustrate schematically a second exemplary embodiment of a method for manufacturing a container according to the invention.

DETAILED DESCRIPTION

Figure 1:
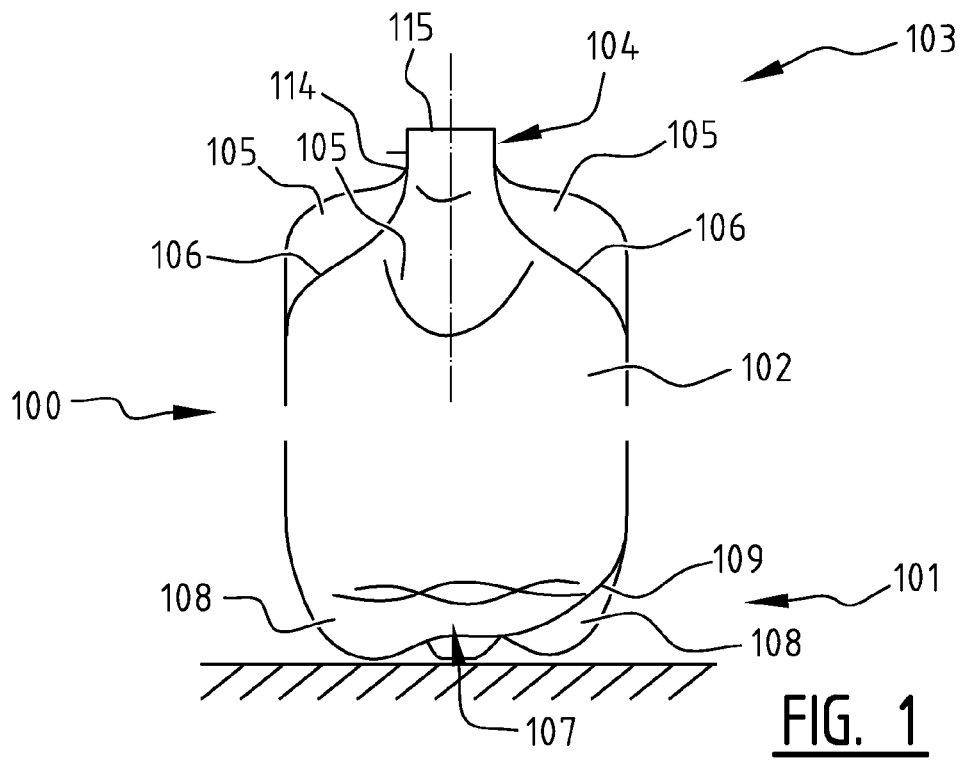
FIG. 1 is a schematic front view of a first embodiment of a container according to the invention.
Figure 3A:
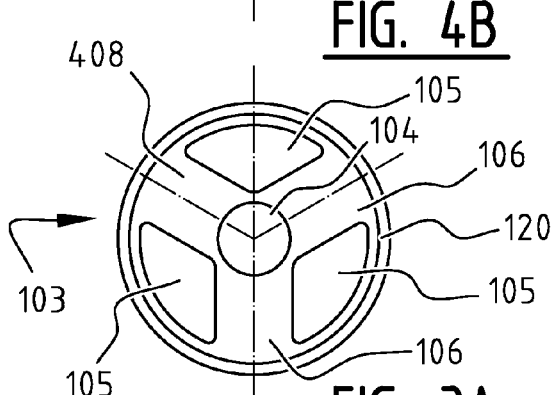
FIGS. 3A and 3B show schematically a first possible top and bottom view respectively of a container according to the invention.
Figure 3B:
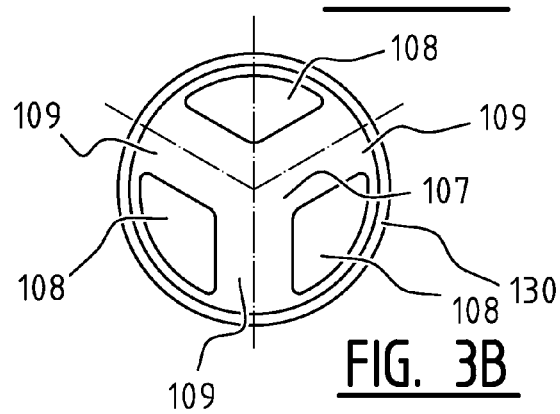

FIG. 1 illustrates a first embodiment of a container of PET material according to the invention. The container comprises an integrally formed body 100 with a bottom 101, an upright substantially cylindrical side wall 102 and an upper side 103 with a neck 104. Neck 104 has a bottom end 114 and an open top end 115 in which a closing element of the container can be mounted (not shown). According to a possible embodiment a valve assembly is fitted in neck 104 by means of internal or external screw thread, or the valve assembly is snapped fixedly into neck 104 of the container. In the illustrated variant the upper side 103 is formed around neck 104 with three shoulders 105. Each shoulder 105 runs largely horizontally between neck 104 and upright side wall 102 in the direction of upright side wall 102. A valley 106 is situated in each case between two shoulders 105. A top view of upper side 103 is shown in FIG. 3A. Shoulders 105 thus form three support surfaces between which a radial valley is situated in each case. Bottom 101 is formed with a substantially centrally located recess 107 directed toward the interior of the container. This central recess 107 preferably has dimensions such that a part of neck 104 of a second container can be received therein when the container is placed on the second container. Bottom 101 is further formed with three support feet 108 which extend at a distance from each other around recess 107. A radial recess 109 extending from cylindrical side wall 102 to central recess 107 is situated between each pair of mutually adjacent support feet 108, see FIG. 3B.

Figure 4A:
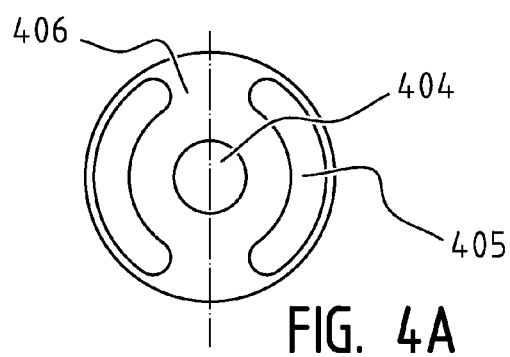
FIGS. 4A and 4B show schematically a second possible top and bottom view respectively of a container according to the invention.
Figure 5A:
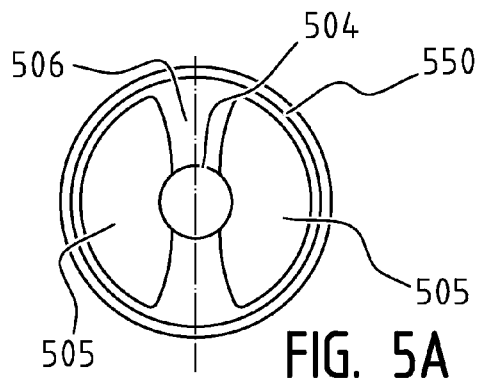
FIGS. 5A and 5B show schematically a third possible top and bottom view respectively of a container according to the invention.
Figure 6A:
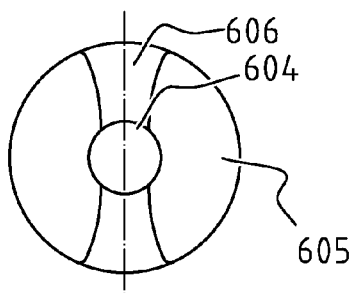
FIGS. 6A and 6B show schematically a fourth possible top and bottom view respectively of a container according to the invention.

The skilled person will appreciate that many variants of the first embodiment are possible which fall within the scope of the invention. FIGS. 4A, 5A and 6A thus illustrate three other possible embodiments of the upper side of the container. Note that these are schematic top views in which the more or less flat upper wall of a shoulder is shown in each case. In the variant of FIG. 4A the upper side has two shoulders 405 lying diametrically opposite each other with an upper surface in the form of a ring section. Shoulders 405 are separated from each other by two valleys 406 lying diametrically opposite each other and each extending from neck 404 to the outer wall of the container. FIG. 5A illustrates a more or less similar upper side, but wherein shoulders 505 take a wider form. In the embodiment of FIG. 5A an upper ring 550 is further provided around the shoulders, see below. FIG. 6A illustrates a variant very similar to that of FIG. 5A, but without upper ring. A difference from the variant of FIG. 5A lies in the fact that the outer wall of shoulders 605 lies in the line of the upright side wall of the container, as is the case for the embodiment of FIG. 2, see below.

Figure 4B:
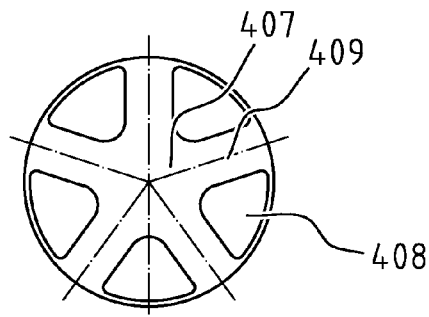
Figure 5B:
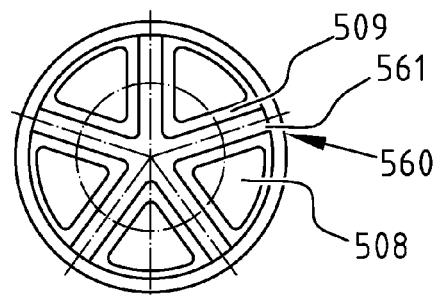
Figure 6B:
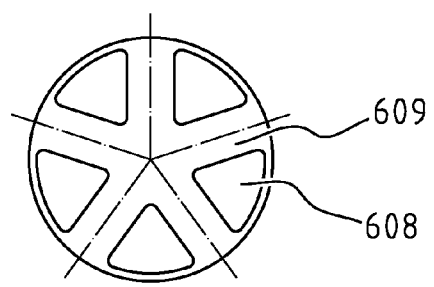

FIGS. 4B, 5B and 6B further illustrate variants for the shaping of the bottom of the container of FIG. 1. Note that these are schematic bottom views in which the more or less flat lower wall of a support foot it is shown in each case. Five support feet 408 are provided in the variant of FIG. 4B. A radial recess 409 is situated between each pair of adjacent support feet 408. This radial recess 409 extends from a central recess 407 to the outer wall. FIG. 5B illustrates a similar variant of a bottom, where a lower ring 560 is provided around support feet 508. Further provided is an inner frame with radially directed arms 561 which are connected to outer ring 560. This inner frame is preferably formed integrally with lower ring 561. Such an inner frame allows strengthening of the bottom of the container. FIG. 6B illustrates yet another variant which is similar to the variant of FIG. 5B, but without lower ring. When a simple lower ring without inner frame is used, there is created in radial recesses 509, 609 a space in which a hand can be placed for the purpose of holding the lower ring. The skilled person will appreciate that the number of shoulders and the number of support feet can be variable depending on the dimensions of the container, the required strength, the stability and so on.

Figure 2:
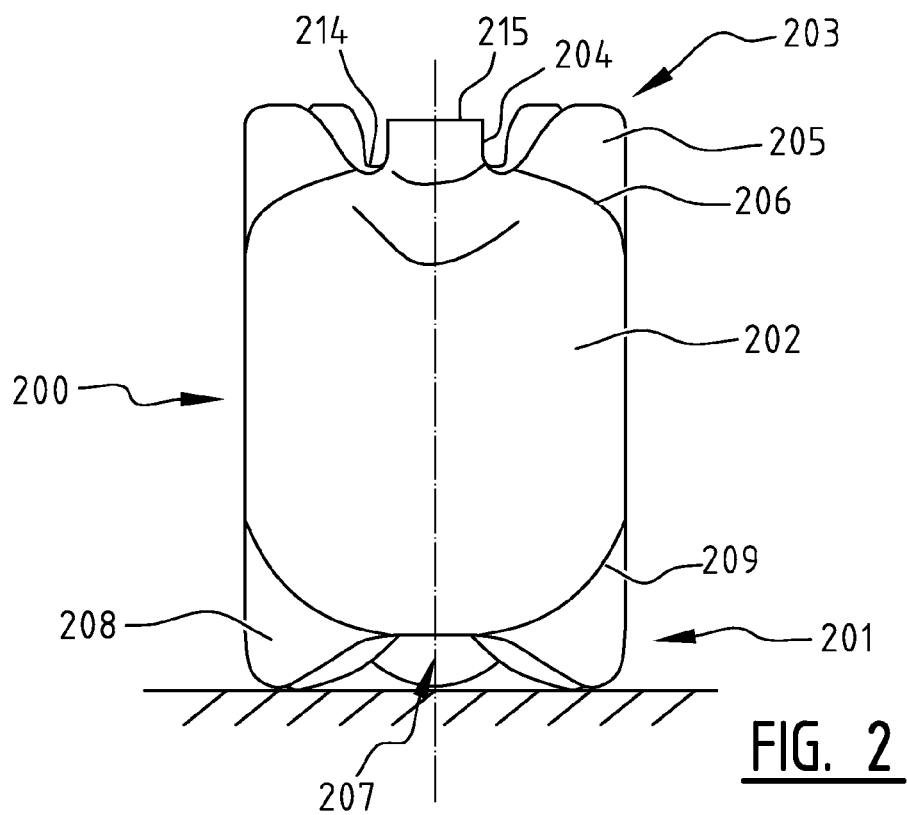
FIG. 2 is a schematic front view of a second embodiment of a container according to the invention.

FIG. 2 illustrates a second embodiment of a container of PET material according to the invention. The container comprises an integrally formed body 200 with a bottom 201, an upright substantially cylindrical side wall 202 and an upper side 203 with a neck 204. As in the embodiment of FIG. 1, the cylindrical side wall 202 here has a substantially constant section. The skilled person will however appreciate that it is possible to deviate herefrom to some extent, and that strengthening rings can for instance be arranged at different heights along the periphery of cylindrical side wall 202. The diameter of the cylindrical side wall can further also become slightly smaller in the vicinity of the support feet (see for instance FIG. 1) and/or in the vicinity of the shoulders. Neck 204 has a bottom end 214 and an open top end 215. Provided around neck 204 are five shoulders 205 which are formed integrally together with the rest of body 200. Body 200 is typically manufactured by stretch blow moulding, wherein shoulders 205 are formed by blowing upward. A first part of each shoulder 205 runs upward in outward direction and then extends substantially horizontally to form substantially horizontal support surfaces. The outer wall of each shoulder 205 runs substantially vertically and extends in the line of cylindrical side wall 202. Such a shaping will ensure that the containers can be stacked in compact manner and that upper and lower rings can be arranged on the container in simple manner, see below. Extending between each pair of mutually adjacent shoulders 205 is a valley 206 which runs downward in radial direction from the bottom end 214 of the neck to side wall 202. The bottom is formed with five support feet 208 which extend symmetrically around recess 207. Each support foot 208 has a substantially straight, upright outer wall which connects to the straight, upright cylindrical side wall 202. A radial recess extending from side wall 202 to central recess 207 is situated in each case between mutually adjacent support feet 208. These radial recesses are shown more clearly in the bottom view of FIG. 4B of a bottom similar to the bottom of FIG. 2. The bottom is provided with five support feet 408 which are separated from each other by radial recesses 409 extending between a central recess 407 and the outer wall.

Many variants with more or fewer than five shoulders and support feet are also possible for the second embodiment of FIG. 2. The upper sides illustrated in the top views of FIGS. 3A, 4A, 5A and 6A can thus all be envisaged for the second embodiment of FIG. 2. The bottoms illustrated in the bottom views of FIGS. 3B, 4B, 5B and 6B are in similar manner possible as the bottom of the second embodiment.

Figure 7A:
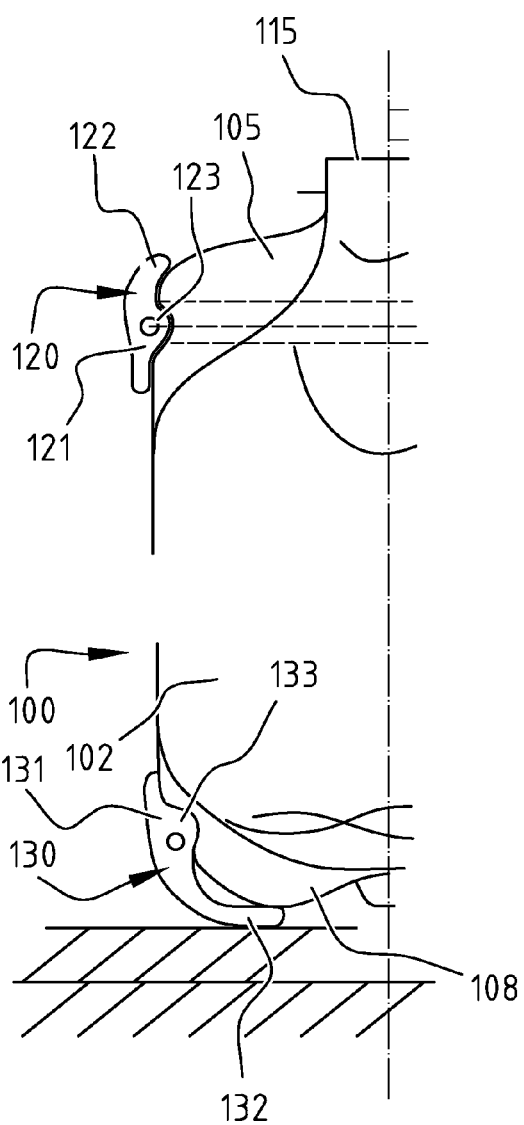
FIG. 7A shows schematically an embodiment corresponding to FIG. 1, wherein a first variant of an upper and lower ring is arranged.
Figure 7B:
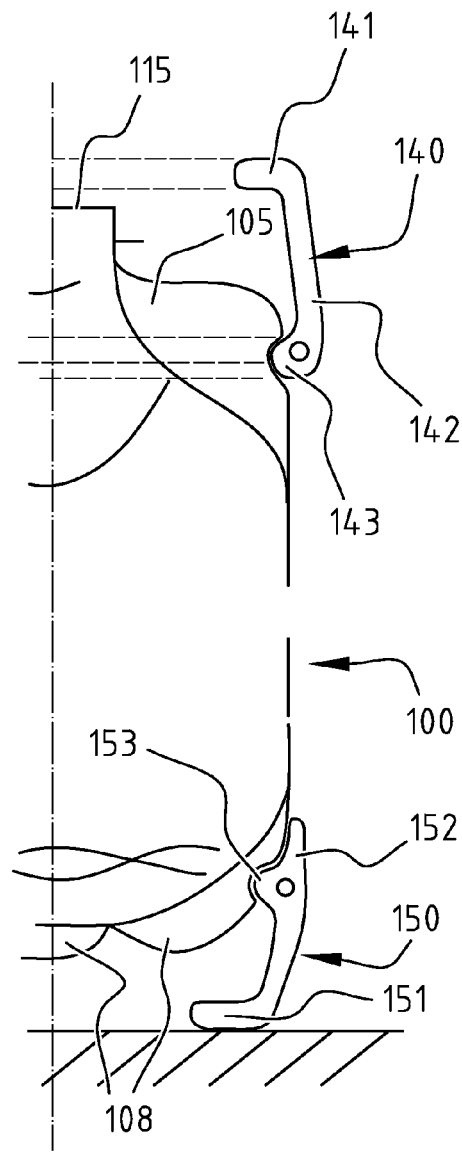
FIG. 7B illustrates schematically an embodiment corresponding to FIG. 1, wherein a second variant of an upper and lower ring is arranged.

As illustrated in FIGS. 7A and 7B, container body 100 can be provided with an upper ring 120 and a lower ring 130. Upper ring 120 is provided around shoulders 105 of the container. In this way the ring 120 will form handles at the position of valleys 106. In the design of the container the number of shoulders is preferably selected such that suitable handles are formed and that sufficient space is available around neck 104 of the container. In an advantageous embodiment of the container body two to three shoulders 105 will typically be provided. In the variant illustrated in FIG. 7A the ring 120 is provided on the inner side with a peripheral rib 123 intended for co-action with a complementary groove arranged in the outer wall of shoulders 105. In addition, upper edge 122 of ring 120 is preferably curved inward to some extent with a shaping complementary to the form of the outer wall of shoulder 105. The underside of the container is provided in similar manner with a lower ring 130. This lower ring 130 extends around support feet 108. Lower ring 130 is provided on the inner side with a protruding rib 133 which fits into a groove with a complementary form provided in the outer wall of each support foot 108. The ring is further provided at the bottom with an inward directed, substantially horizontal inner flange 132, this annular inner flange 132 being intended to form a support for the container.

FIG. 7B illustrates a second variant of an upper ring 140 and a lower ring 150. Note that upper ring 120 of FIG. 7A can be combined with lower ring 150 of FIG. 7B, and that lower ring 130 of FIG. 7A can be combined with upper ring 140 of FIG. 7B. Upper ring 140 and lower ring 150 can optionally also be identical to each other. Upper ring 140 has an annular, substantially vertical flange 142 and an inward directed, substantially horizontal flange 141. The annular inner flange 141 is intended for the purpose of forming an annular support for a second container placed on a first container. The vertical annular flange 142 preferably has a height such that the horizontal inner flange 141 is situated higher than the top end of neck 115. Upper ring 140 is also provided here with an inward directed, protruding thickened portion 143 intended for co-action with a complementary recess in the outer wall of shoulder 105. Lower ring 150 is similar to lower ring 130, with the difference that the vertical annular flange 152 is higher than the vertical annular flange 131.

The following procedure can be used to arrange such an upper ring 120, 140 and/or such a lower ring 130, 150. The upper and/or lower ring is arranged over the upper side and/or underside of the container when the container is in the pressureless state (not filled) or in a state in which a low pressure prevails in the container and the valve assembly is arranged in the neck. The pressure in the container is then increased until the upper/lower ring is firmly fixed. If upper/lower ring were to be made of a different material (for instance PE or PP) than the container body (typically PET), separation of materials must take place during recycling. This is possible by decreasing the pressure in the container, whereby the rings come loose. Note that the rings can also be manufactured from the same PET material as the container body.

FIGS. 8A and 8B illustrate the second embodiment of container body 200 on which an upper ring and a lower ring are mounted. In the variant of FIG. 8A upper ring 220 consists of a substantially vertical annular flange 221 provided with a protruding peripheral rib 223 on the inner side and with a rolling surface on its outer side. This peripheral rib is intended to engage in a peripheral groove provided in the outer wall of each shoulder 205. Lower ring 230 is substantially identical to upper ring 220 and consists substantially of a vertical annular flange 231 provided on the inner side with a protruding peripheral rib 233. In the variant of FIG. 8B the upper ring 240 is formed with a substantially vertical annular flange 242 which transposes at the top into a substantially horizontal, annular inner flange 241 intended to extend partially over the upper surface of shoulder 205. In this way the annular flange 241 forms an annular support on which a second container can be placed. In similar manner the lower ring 250 is formed with a substantially vertical annular flange 252 which transposes at the bottom into a substantially horizontal, annular, inward directed flange 251. The vertical annular flange 252 is provided on the inner side with a protruding peripheral rib 253 intended for co-action with a complementary recess in the outer wall of each support foot 208. These rings 220, 230, 240, 250 can be arranged on the container in similar manner as described for FIGS. 7A and 7B.

Figure 11:
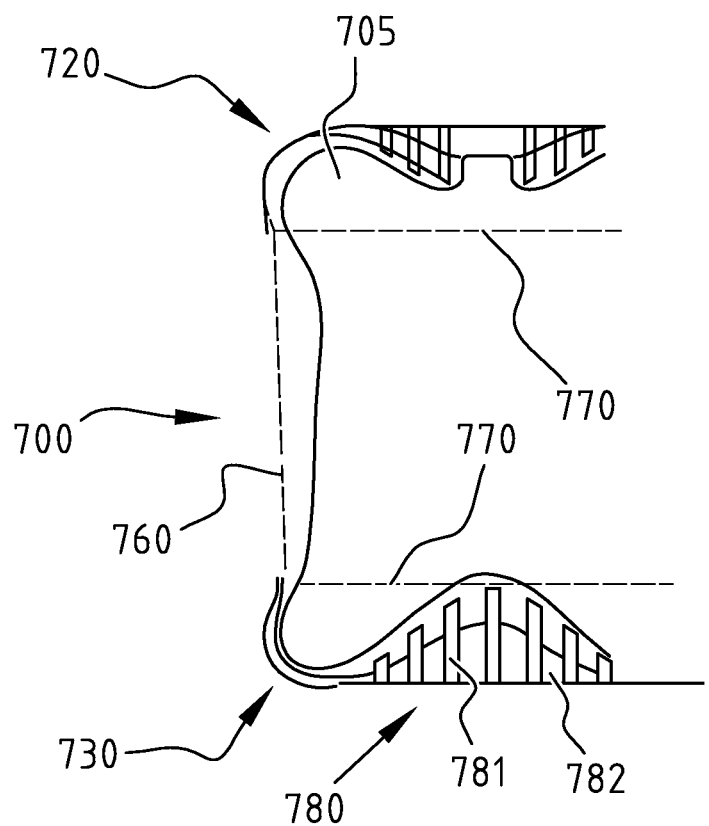
FIG. 11 illustrates schematically a third embodiment of a container according to the invention.

FIGS. 9A and 9B illustrate two other possible variants of an upper or lower ring according to the invention. FIG. 9A shows a cross-section of a ring intended for arrangement around the support feet or shoulders of a container according to the invention, as also illustrated in FIG. 10B and FIG. 11. The advantage of such a shaping is that it can be realized in simple manner by injection moulding. When such an arcuate form 320 (FIG. 9A), 620 and 630 (FIG. 10B), 720 and 730 (FIG. 11) is used, additional connecting means will preferably be used between upper ring 720 and lower ring 730, as illustrated in FIG. 11. These additional connecting means can for instance consist of a number of bands 760 in the form of straps which mutually connect the upper and lower rings. Two or more straps can for instance thus be provided between upper ring 720 and lower ring 730. These vertical straps 760 typically run substantially parallel to the upright walls. These vertical straps are preferably also manufactured from a PET material. In addition, horizontal straps 770 extending around the lower ring and/or upper ring can also be provided. Instead of using horizontal straps 770, the upper and/or lower ring can also be formed with a strengthening profile, for instance consisting of concentric strengthening rings 781 mutually connected by means of ribs 782. In this way an inner frame 780 is formed which is typically produced integrally with ring 730, preferably from a PET material. Note that such a ring with inner frame is typically combined with vertical straps 760.

According to a variant illustrated in FIG. 9B, an upper/lower ring can also consist of multiple parts. In the variant of FIG. 9B the ring 420 consists of a first part 421 and a second part 422, the first and second parts being provided with mutually engaging complementary profiles 423, 424.

Finally, FIGS. 10A and 10B illustrate still further developed variants of the upper and lower ring which are adapted particularly to improve the stackability of the containers. In the variant illustrated in FIG. 10A the upper ring 530 consists substantially of an upright annular flange 531 and a horizontal annular inner flange 532. The horizontal annular inner flange 532 is provided with a downward protruding annular rib 533. Upper ring 520 consists substantially of a downward directed annular flange 521, which transposes at the top into a horizontal, annular inner flange 522. Lower ring 520 is adapted to receive the downward protruding annular rib 533, this such that two containers can be placed on one another, wherein the upper container is fixed relative to the lower container. A similar effect can be obtained with the upper ring 620 and lower ring 630 illustrated in FIG. 10B when these upper and lower rings 620, 630 are provided at the position of a contact zone 621 with an anti-slip layer or the like. Such an effect can also be realized by giving rings 620, 630 a rough surface at the position of contact zone 621.

The volume of a container according to the first, second or third illustrated embodiment lies typically between 5 liters and 50 liters, and preferably between 10 liters and 33.33 liters. The diameter of the cylindrical side wall lies typically between 200 mm and 400 mm, and preferably between 285 and 305 mm, or between 235 and 250 mm. The container body according to the first, second or third illustrated embodiment is preferably adapted to store a liquid under a pressure lying between 0.25 bar and 10.00 bar, preferably between 0.50 bar and 3.50 bar.

The illustrated containers are preferably manufactured by stretch blowing, also referred to as stretch blow moulding. Stretch blow moulding is a method in which an injection-moulded preform is stretched in axial direction, after which it is blown in both radial and axial direction into the desired container shape. A first exemplary embodiment of the method used will now be elucidated schematically with reference to FIGS. 12A-D. FIG. 12A illustrates a first step in which a PET material is first injection moulded to a preform 1005 using an injection moulding process. Use is typically made here of an outer mould 1001, an inner mould 1002 and a neck mould 1003. The neck and inner moulds 1002, 1003 can pull the preform out of the outer mould, after which the preform can be knocked off the neck and inner moulds. Preforms 1005 typically already have their definitive neck finish, including screw thread and the like. These preforms are typically packaged and delivered after cooling (FIG. 12B). The preforms are later reheated (FIG. 12C) in a stretch blow moulding (SBM) machine. This heating usually takes place using infrared heaters. The preforms are here heated to above their glass temperature. The actual SBM process is illustrated in FIG. 12D. In a first and second step (arrows 1 and 2) the various mould parts 1011-1016 are placed in position. In the illustrated variant these mould parts comprise two horizontally movable side wall mould parts 1011, 1012 which connect to a vertically movable bottom mould 1013. A three-part upper mould 1014, 1015, 1016 is further provided which is adapted on the one hand to be able to engage around and under the neck and on the other to guide a stretch rod 1017. The movable mould parts 1014 and 1015 are typically movable vertically and horizontally or movable obliquely, and are further adapted to connect to the side wall mould parts 1011, 1012. The upper and lower mould parts 1013-1016 are positioned in a first step and the side wall mould parts 1011, 1012 in a second step. In a third and fourth step the stretch rod 1017 is moved downward to stretch the preform. Finally, the container body is blown in a fifth step. Pre-blowing typically takes place first here under low pressure, after which blowing of the shoulders and support feet takes place at a higher pressure. During these operations the neck part, i.e. the part that is being held by mould parts 1014-1017, is not deformed and has a substantially constant inner diameter, i.e. constant within the normal tolerances of preforms.

A second exemplary embodiment of the method used will now be elucidated schematically with reference to FIGS. 19A-C. In a first non-illustrated step a PET material is injection moulded to a preform 2005 using an injection moulding process. The preform 2005 typically already has a definitive neck finish, including screw thread and the like. However, it is also possible to provide the neck finish during an additional step. In order to form the container the preform 2005 is reheated in a stretch blow moulding (SBM) machine as illustrated in FIG. 19A. This heating usually takes place using infrared heaters. The preform 2005 is heated to above the glass temperature of the PET material used. In a first and second step the various mould parts 2011-2018 are placed in position. In the illustrated variant these mould parts comprise two horizontally movable side wall mould parts 2011, 2012 which connect to a bottom mould part 2013. Around the neck 2104 of the preform 2005, there is provided a plurality of upper mould parts 2016-2018. The side wall mould parts 2011, 2012 are adapted to engage around the bottom mould part 2013 and the upper mould parts 2016-2018. The plurality of upper mould parts comprises a shoulder forming part 2017 having an inclined bottom wall 2027 extending upwardly in a radial direction around the neck 2104, two removable parts 2018 located below the shoulder forming part 2017, and a guide part 2016. The removable parts 2018 may have an inclined upper wall 2028 matching the bottom wall 2027. Further there is provided a guide part 2016 to guide the stretch rod 2030. As indicated by the dotted line in FIGS. 19A and 19B, the guide part 2016 and the shoulder forming part 2017 may be a single piece mould part. FIG. 19A illustrates that the stretch rod 2030 is moved downward to stretch the preform 2005, as in FIG. 12D, such that an intermediate container body is blown. The blowing may comprise pre-blowing under low pressure, after which blowing of the at least one (intermediate) shoulder 2105 and support feet 2108 takes place at a higher pressure. Next the side mould parts 2011 and 2012 are removed, in order to remove the removable mould parts 2018, whereupon the side mould part 2011 and 2012 may be put back in place. The neck 2104 is pushed downward by moving the shoulder forming part 2017 downward, as illustrated in FIG. 19B, whilst the material is still at a sufficiently high temperature, so that the neck 2104 is located in a recessed part and the top 2115 of the at least one (final) shoulder 2105 is situated at a higher level than the bottom end 2114 of the neck 2104, see FIG. 19C. During the forming of the at least one (final) shoulder 2105 in the step of FIG. 19B, guide part 2016 may be moved downwardly together with shoulder forming part 2017, but this is not required.

A person skilled in the art of moulds understands that other multi-part moulds may be used to achieve a pushing down of the neck part in order to form shoulders extending upwardly from the bottom end of the neck.

Note that the invention also relates to a stretch blow moulding method for manufacturing a container in which a different starting material is used, such as acrylonitrile (AN), polystyrene (PS), polyvinyl chloride (PVC), polyamide (PA), polycarbonate (PC), polysulfone, acetal radical polyarylate, polypropylene (PP), Surlyn and polyethylene terephthalate (PET).

FIGS. 13A, 13B, 14 and 15 illustrate a third embodiment of a plastic container according to the invention. This container is intended particularly for storing liquid under pressure, preferably lying between 0.25 bar and 10.00 bar, and still more preferably between 0.50 bar and 3.50 bar. The skilled person will however appreciate that the container can also be employed for storing pressureless liquids, gases or solids, optionally with the necessary modifications such as a modified wall thickness etc. The container comprises an integrally formed body 1300 with a bottom 1301, an upright, substantially cylindrical side wall 1302 and an upper side 1303 with a neck 1304. The container is preferably manufactured according to one of the described embodiments of the method according to the invention by stretch blow moulding, preferably from one of the following materials: a PET material, in particular bottle grade PET, a PP material, a PE material.

The upper side 1303 is formed around neck 1304 with four shoulders 1305. Formed between each pair of adjacent shoulders 1305 is a valley 1306 which runs downward in radial direction from neck 1304 in the direction of upright side wall 1302. Each shoulder 1305 runs for the most part substantially horizontally in radial direction between the neck and the upright side wall. According to a variant, a or each shoulder runs upward or downward at an angle of less than 45 degrees in the direction of the upright side wall. The upright cylindrical side wall 1302 is substantially straight and each shoulder 1305 has a substantially straight, upright outer wall which connects to the straight, upright cylindrical side wall 1302.

Bottom 1301 is formed with a substantially centrally located recess 1307 directed toward the interior of the container and with four foot supports 1308. A radial recess 1309 is situated between every two adjacent support feet 1308. Each support foot 1308 has a substantially straight, upright outer wall which connects to the substantially straight, upright cylindrical side wall 1302.

Figure 14:
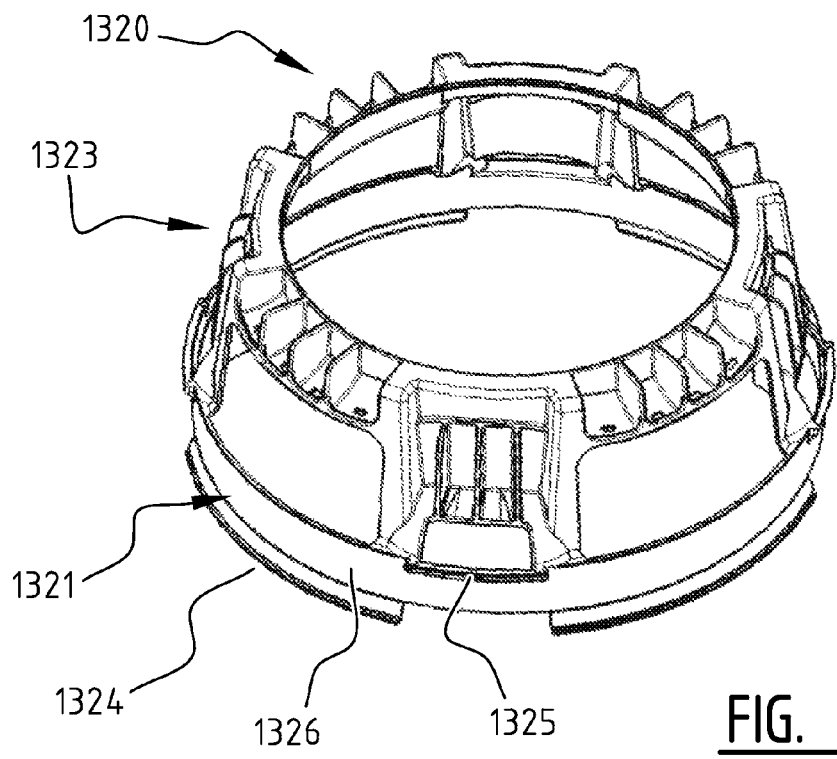
FIGS. 14 and 15 show a perspective view of respectively the upper ring as seen from the top side and the lower ring as seen from the underside of the container of FIG. 13A.
Figure 15:
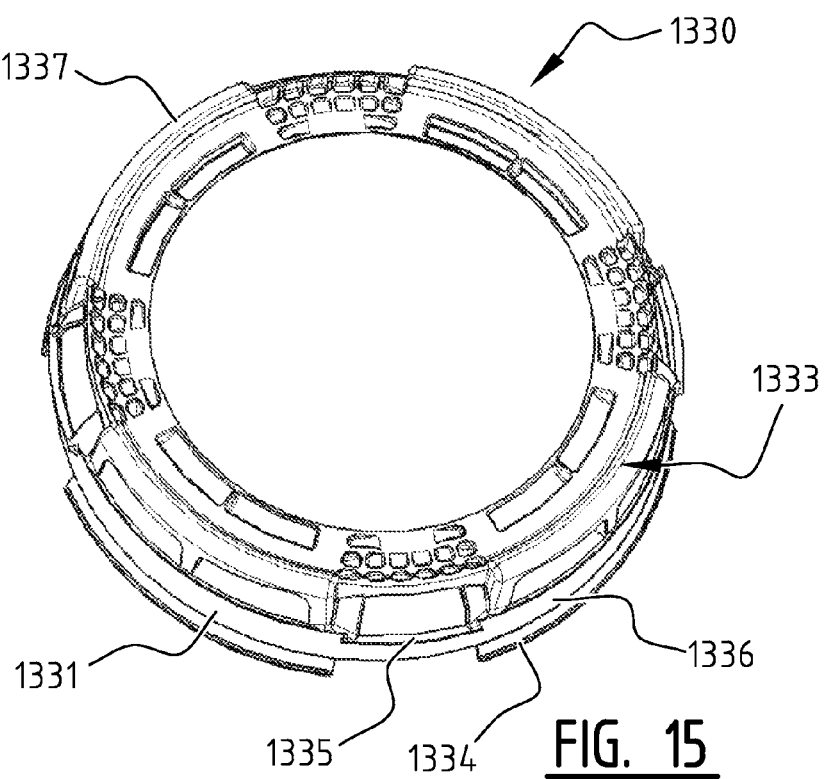

An upper ring 1320 is provided around shoulders 1305, see FIG. 13A and FIG. 14. This upper ring 1320 is adapted to form a support ring when the container is rolled in a tilted position. Upper ring 1320 is formed at the bottom with a clamping ring 1321 which engages around shoulder 1305. For this purpose each shoulder 1305 is formed along its outer periphery with an adapted recess 1322 for receiving clamping ring 1321 therein, wherein the above described method can be used to arrange clamping ring 1321 around the shoulders. A band 1370 can further be provided around clamping ring 1321 in order to absorb forces exerted on upper ring 1320 resulting from the pressure in the container. Clamping ring 1321 is provided along its outer periphery with a receiving part 1326 for receiving and positioning band 1370 therein, this receiving part being bounded by edges 1324 and 1325. These edges 1324, 1325 protrude relative to band 1370 and thus form the support edges on which the container can be rolled in the tilted position. Upper ring 1320 is further formed with an upper support part 1323 adapted to form a support surface for a second container placed on the container.

A lower ring 1330 is provided around support feet 1308. Lower ring 1330 is adapted to form a support ring when the container is rolled in a tilted position and to form a bottom support surface when the container is placed on the ground or on another container. Lower ring 1330 is formed at the top with a clamping ring 1331 which engages around support feet 1308. Each support foot 1308 is formed along its outer periphery with an adapted recess 1332 for receiving clamping ring 1331 therein. A band 1380 can be provided around clamping ring 1331 in order to absorb the forces on lower ring 1330 resulting from the pressure in the container. For this purpose clamping ring 1331 can be provided along its outer periphery with a receiving part 1336 for receiving and positioning band 1380 therein, this receiving part being bounded by edges 1334 and 1335. These edges 1334, 1335 protrude relative to band 1380 and thus form the support edges on which the container can be rolled in the tilted position. Lower ring 1330 is further formed with a support part 1333 adapted to form the bottom support surface. Support part 1333 is provided here with a downward protruding peripheral edge 1337 which is dimensioned to drop over an upper ring 1320 situated thereunder when two containers are placed one on another. A good positioning of a container on a container located thereunder is in this way ensured.

On upper side 1303 of the container valleys 1306 are made sufficiently deep such that clamping ring 1321 forms a handle at the position of a valley 1306, see FIG. 13A. In similar manner the radial recesses 1309, support feet 1308 and lower ring 1330 are such that the lower ring forms a handle at the position of radial recesses 1309. It will in this way also be possible to carry the container in the tilted position of the container, wherein a handle formed by the upper ring and a handle formed by the lower ring are gripped.

The upper and/or lower ring 1320, 1330 are preferably manufactured from a PET material, preferably by injection moulding. Upper ring 1320 can further be connected to lower ring 1330 by means of at least two bands or straps, preferably manufactured from a PET material. Outer casing 1302 of the container can further be provided with a number of peripheral grooves 1391. Such a peripheral groove is formed for the purpose of arranging a clamping band 1390 therein in order to limit the increase in the outer diameter as a result of the pressure in the container and so avoid at all times the possibility of the container being rolled on its outer casing 1302 instead of on upper and lower rings 1320, 1330.

FIGS. 16-18 illustrate yet another variant of an upper and lower ring 1420, 1430 according to the invention. Compared to the upper ring of FIG. 14, the upper ring of FIG. 16 is formed with a strengthened clamping ring 1421, here a double-walled clamping ring 1421. In this way no additional band will be necessary around the clamping ring. Lower ring 1430 is provided in similar manner with a strengthened, double-walled clamping ring 1431.

The skilled person will appreciate that the invention is not limited to the above illustrated exemplary embodiments and that many variants can be envisaged without departing from the scope of the invention, which is defined solely by the following claims.

The invention claimed is:
1. A plastic container comprising an integrally formed body with
a bottom;
an upright substantially cylindrical side wall; and
an upper side with a neck having a bottom end and an open top end in which a closing element of the container can be mounted; said neck having an inner diameter which is substantially constant;
wherein the upper side of the container, around the neck, is formed with at least one shoulder and at least one valley which runs downward in radial direction from the neck in the direction of the upright side wall; wherein each shoulder protrudes upward relative to the at least one valley; which at least one shoulder and at least one valley are formed integrally with the body of the container;
wherein said at least one shoulder has a top which is situated at the same height or higher than the bottom end of the neck.

2. The container as claimed in claim 1, wherein the container is manufactured by blowing.

3. The container as claimed in claim 1, wherein the container is manufactured from one of the following materials: a PET material, a PP material, a PE material.

4. The container as claimed in claim 1, wherein the container body is adapted to store a liquid under a pressure lying between 0.25 bar and 10.00 bar.

5. The container as claimed in claim 1, wherein the at least one shoulder is adapted to form a support surface for the bottom of a second container according to claim 1 which is placed on the container, wherein the support surface is situated at the same height or higher than the bottom end of the neck.

6. The container as claimed in claim 1, wherein the upright substantially cylindrical side wall has a central axis, wherein an upper ring is provided around the at least one shoulder.

7. The container as claimed in claim 6, wherein the at least one valley and the at least one shoulder are such that the upper ring forms a handle at the position of the at least one valley.

8. The container as claimed in claim 1, wherein the upper side is provided with at least two shoulders, which shoulders are arranged at a distance from each other along an outer periphery of the neck, such that each valley extends between the shoulders, where each valley runs downward in the direction of the upright side wall.

9. The container as claimed in claim 1, wherein the upright cylindrical side wall is substantially straight and each shoulder has a substantially straight upright outer wall which connects to the straight, upright cylindrical side wall.

10. The container as claimed in claim 1, wherein the bottom is formed with at least one support foot located around a central recess.

11. The container as claimed in claim 10, wherein the bottom is formed with at least two support feet which are located at a distance from each other around the central recess; wherein the upright substantially cylindrical side wall has a central axis, wherein a lower ring is provided around the at least one support foot, which lower ring is adapted:
to form a support ring when the container is rolled in a tilted position in which the central axis extends substantially horizontally; and/or
to form a bottom support surface.

12. The container as claimed in claim 10, wherein an upper ring is provided around the at least one shoulder and that a lower ring is provided around the at least one support foot.

13. A method for manufacturing a container by stretch blow moulding of a thermoplastic material, comprising the steps of:
    providing a preform with a neck part, said preform being made of a thermoplastic material;
    fixing said preform around said neck part;
    forming a container body by stretching and blowing the preform below the neck part, wherein the container body is formed around the neck part with at least one shoulder with a top which is situated at the same height or higher than the bottom end of the neck part.

14. The method of claim 13, wherein the forming of the container body comprises blowing the thermoplastic material upwardly around the fixed neck part to form the at least one shoulder.

15. The method of claim 13, wherein the forming of the container body comprises blow moulding an intermediate container body and pushing the neck part of the intermediate container body downward whilst supporting the intermediate container body, to form the at least one shoulder with the top which is situated at the same height or higher than the bottom end of the neck part.

16. The method as claimed in claim 14, wherein a multi-part mould comprising two horizontally movable side wall moulds, a vertically movable lower mould and a multi-part upper mould, is used, wherein the upper mould has at least two parts which can move either horizontally and vertically or obliquely, and a vertically movable central part for guiding a stretch rod.

17. The method as claimed in claim 15, wherein a multi-part mould is used to form the intermediate container body by stretch blow moulding, whereupon a part of the multipart mould is removed and the neck part is pushed inward to deform the intermediate container body in order to create said at least one shoulder with said top which is situated at the same height or higher than the bottom end of the neck part.

* * * * *